United States Patent
Nagara

(10) Patent No.: US 9,741,315 B2
(45) Date of Patent: Aug. 22, 2017

(54) ADJUSTING A TRANSPARENT DISPLAY WITH AN IMAGE CAPTURING DEVICE

(71) Applicant: Wes A. Nagara, Commerce Township, MI (US)

(72) Inventor: Wes A. Nagara, Commerce Township, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/276,635

(22) Filed: May 13, 2014

(65) Prior Publication Data

US 2015/0009126 A1  Jan. 8, 2015

Related U.S. Application Data

(60) Provisional application No. 61/842,783, filed on Jul. 3, 2013.

(51) Int. Cl.
*G09G 5/10* (2006.01)
*G06F 3/00* (2006.01)
*B60R 16/023* (2006.01)
*G06F 3/01* (2006.01)
*G06K 9/00* (2006.01)

(52) U.S. Cl.
CPC ............ *G09G 5/10* (2013.01); *B60R 16/023* (2013.01); *G06F 3/005* (2013.01); *G06F 3/013* (2013.01); *G06K 9/00302* (2013.01); *G09G 2320/066* (2013.01); *G09G 2320/08* (2013.01); *G09G 2354/00* (2013.01); *G09G 2380/10* (2013.01)

(58) Field of Classification Search
CPC ........ B60R 16/023; G06F 3/005; G06F 3/013
See application file for complete search history.

(56) References Cited

U.S. PATENT DOCUMENTS

| | | | | |
|---|---|---|---|---|
| 6,496,117 B2* | 12/2002 | Gutta et al. | .................. | 340/576 |
| 2001/0030640 A1* | 10/2001 | Yoneno | ................ | G06F 3/0425 345/156 |
| 2002/0030660 A1* | 3/2002 | Arakawa | ....................... | 345/102 |
| 2004/0046712 A1* | 3/2004 | Naimer | ................ | G01C 23/005 345/9 |
| 2005/0156810 A1* | 7/2005 | Zerphy et al. | ................. | 345/1.1 |
| 2007/0296848 A1* | 12/2007 | Terashima | ............. | G03B 13/14 348/345 |
| 2008/0051946 A1* | 2/2008 | Breed | ............... | 701/1 |
| 2008/0106553 A1* | 5/2008 | Lee et al. | ...................... | 345/590 |
| 2009/0027332 A1* | 1/2009 | Cieler et al. | ................. | 345/156 |
| 2009/0066728 A1* | 3/2009 | Ording | ......................... | 345/652 |
| 2012/0066035 A1* | 3/2012 | Stanger | ............. | G06Q 30/0207 705/14.1 |

(Continued)

*Primary Examiner* — Kumar Patel
*Assistant Examiner* — Sejoon Ahn
(74) *Attorney, Agent, or Firm* — Dickinson Wright PLLC

(57) ABSTRACT

A system and method for adjusting a transparent display an image capturing device is provided. The system includes an image receiving module to receive an image from the image capturing device, the image capturing device being situated on an opposing side in which the transparent display presents content; an interfacing module to interface with the transparent display; an analysis module to analyze the received image with the interfacing module to perform an analysis; and an output module to perform a display modification or an error indication based on the analysis.

12 Claims, 5 Drawing Sheets

(56) References Cited

U.S. PATENT DOCUMENTS

| | | | |
|---|---|---|---|
| 2012/0270649 A1* | 10/2012 | Griswold et al. | 463/31 |
| 2013/0106820 A1* | 5/2013 | Seo | H04N 13/0438 345/211 |
| 2014/0092121 A1* | 4/2014 | Robinson | G06F 3/1454 345/592 |
| 2014/0160012 A1* | 6/2014 | Su et al. | 345/156 |
| 2014/0204200 A1* | 7/2014 | Suddamalla | H04N 17/002 348/92 |
| 2014/0368611 A1* | 12/2014 | Horentrup | H04N 13/0051 348/43 |

* cited by examiner

ADJUSTING A TRANSPARENT DISPLAY WITH AN IMAGE CAPTURING DEVICE

CROSS REFERENCE TO RELATED APPLICATIONS

This U.S. Patent Application claims the benefit of U.S. Provisional Patent Application Ser. No. 61/842,783 filed Jul. 3, 2013, entitled "Adjusting A Transparent Display With An Image Capturing Device," the entire disclosure of the application being considered part of the disclosure of this application and hereby incorporated by reference.

BACKGROUND

Transparent displays, such as a transparent light emitting display (LED), may be provided to augment pre-existing display units. The transparent display allows a viewer to see through the transparent display simultaneously while being presented information being presented on the display.

The transparent display may be implemented in a vehicle. The vehicle is ideal for a transparent display because the transparent display allows the operator of the vehicle to view mechanical components disposed at a rear of the display (ex. gauges), while simultaneously being served information on the transparent display.

The transparent display may convey information, such as information directed to road conditions, weather, vehicle status, and the like. Thus, the operator of the vehicle may rely on the display of the transparent display to safely and efficiently operate the vehicle.

Vehicles may also incorporate cameras. Cameras, or image capturing devices, may assist the driver in various operations. The camera may be placed in the rear of the vehicle, thereby alerting the vehicle's operator of any obstacles that may be in the vehicle's path while reversing.

SUMMARY

A system and method for adjusting a transparent display an image capturing device is provided. The system includes an image receiving module to receive an image from the image capturing device, the image capturing device being situated on an opposing side in which the transparent display presents content; an interfacing module to interface with the transparent display; an analysis module to analyze the received image with the interfacing module to perform an analysis, and an output module to perform a display modification or an error indication based on the analysis.

DESCRIPTION OF THE DRAWINGS

The detailed description refers to the following drawings, in which like numerals refer to like items, and in which.

DETAILED DESCRIPTION

Transparent displays allow a viewer of the transparent display to see a surrounding environment, while being simultaneously presented information contained on the transparent display. The transparent display may be implemented in various locations. One such example is a vehicle, and in particular, a dashboard area of a vehicle.

However, in certain cases, the information presented on the transparent display may be erroneous. For example, the information may present data that misleads the driver (i.e. presents the wrong speed of the vehicle, or the wrong physical location). This may be due to the fact that a machine driving the transparent display contains bugs or is not operating correctly.

In other cases, the transparent display may be difficult to read. This may be caused by environmental conditions, like an excess or lack of lighting. Thus, the transparent display becomes difficult to see for the operator of the vehicle.

Further, the transparent display may be operated by buttons or physical inputs. Thus, the buttons or physical inputs may encourage an operator of the vehicle to reach over and engage any of the buttons or physical inputs. The action of extending one's appendage to perform this task may be burdensome, and in certain cases, unsafe.

Disclosed herein are systems and methods for integrating a camera behind a transparent display. The camera integrated with the transparent display, according to aspects disclosed herein, may be achieved by placing the camera behind the transparent display, on a side opposing the viewer of the display. In this way, the camera may view not only the viewer of the display, but also the content being displayed on the transparent display.

Further, the aspects disclosed herein may be implemented in a vehicle. For the reasons discussed further below, employing the aspects disclosed herein lead to a safer, convenient, and enhanced driving experience.

Figure 1:
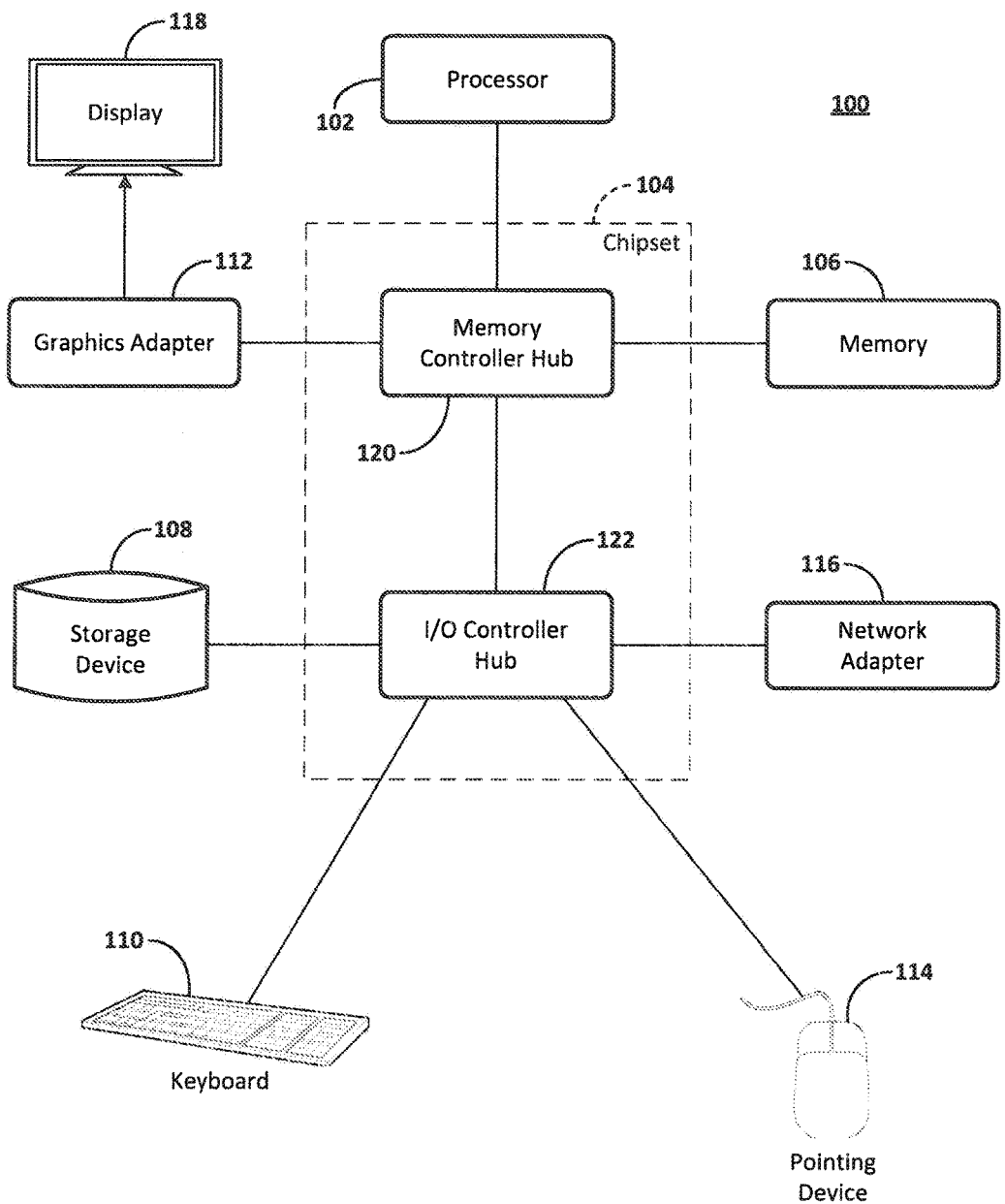
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a video corpus, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
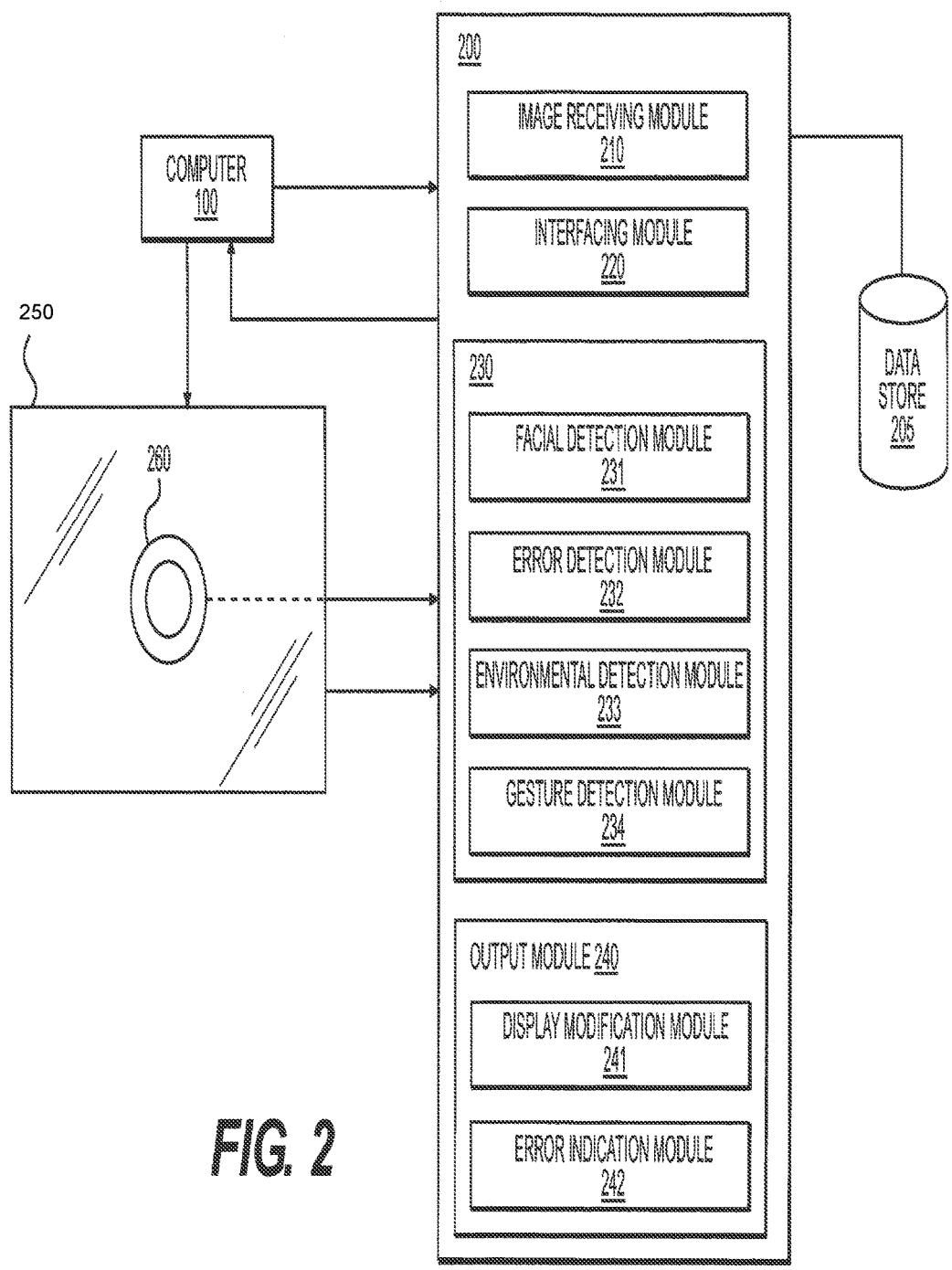
FIG. 2 illustrates an example of a system for adjusting a transparent display with an image capturing device.

FIG. 2 illustrates an example of a system 200 for adjusting a transparent display 250 with an image/video capturing device 260. The system 200 may be incorporated as a device, such as computer 100. The system 200 includes an image receiving module 210, an interfacing module 220, an analysis module 230, and output module 240. The image receiving module 210 may be implemented to communicate with an image/video capturing device 260. The image/video capturing device 260 may be any sort of image/video capturing device 260, such as a digital camera, digital video recorder, or the like. Alternatively, the system 200 may be incorporated with the image capturing device 260, the transparent display 250, or a combination thereof.

Figure 3:
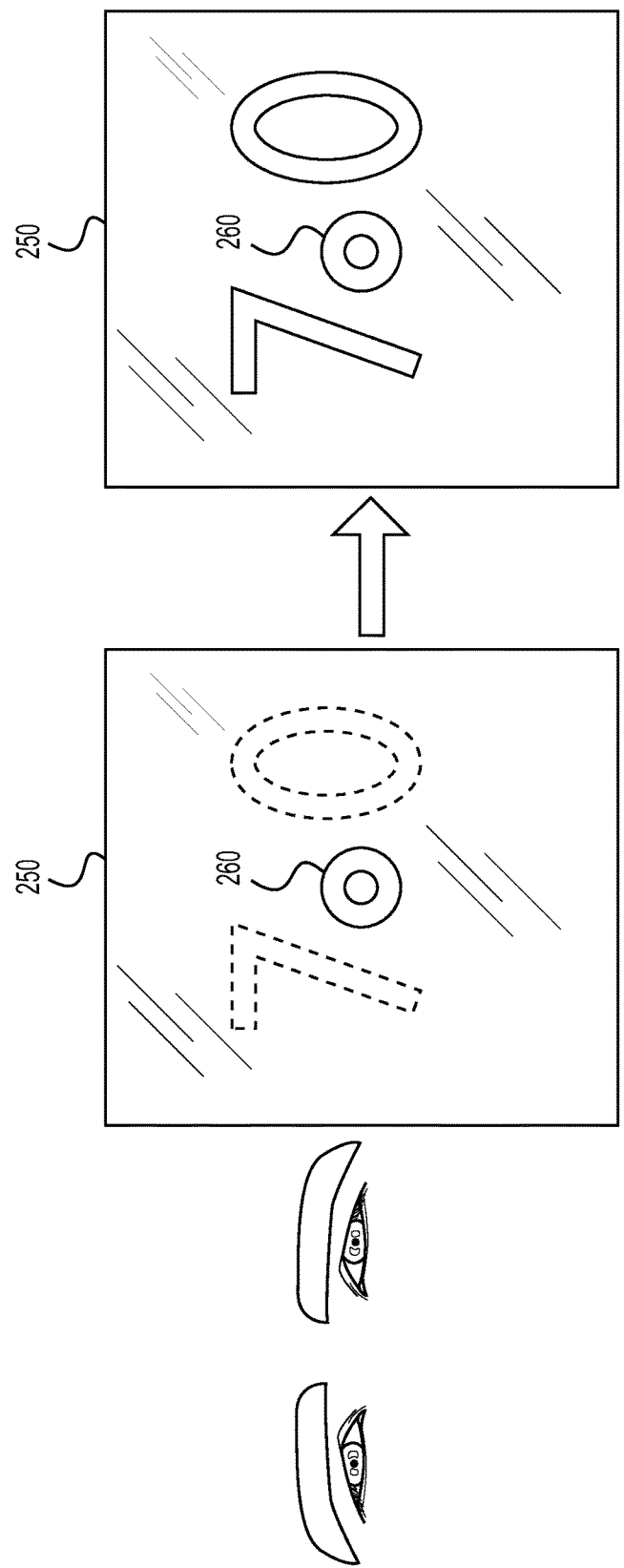
FIGS. 3-5 illustrate example implementations of the system of FIG. 2.
Figure 4:
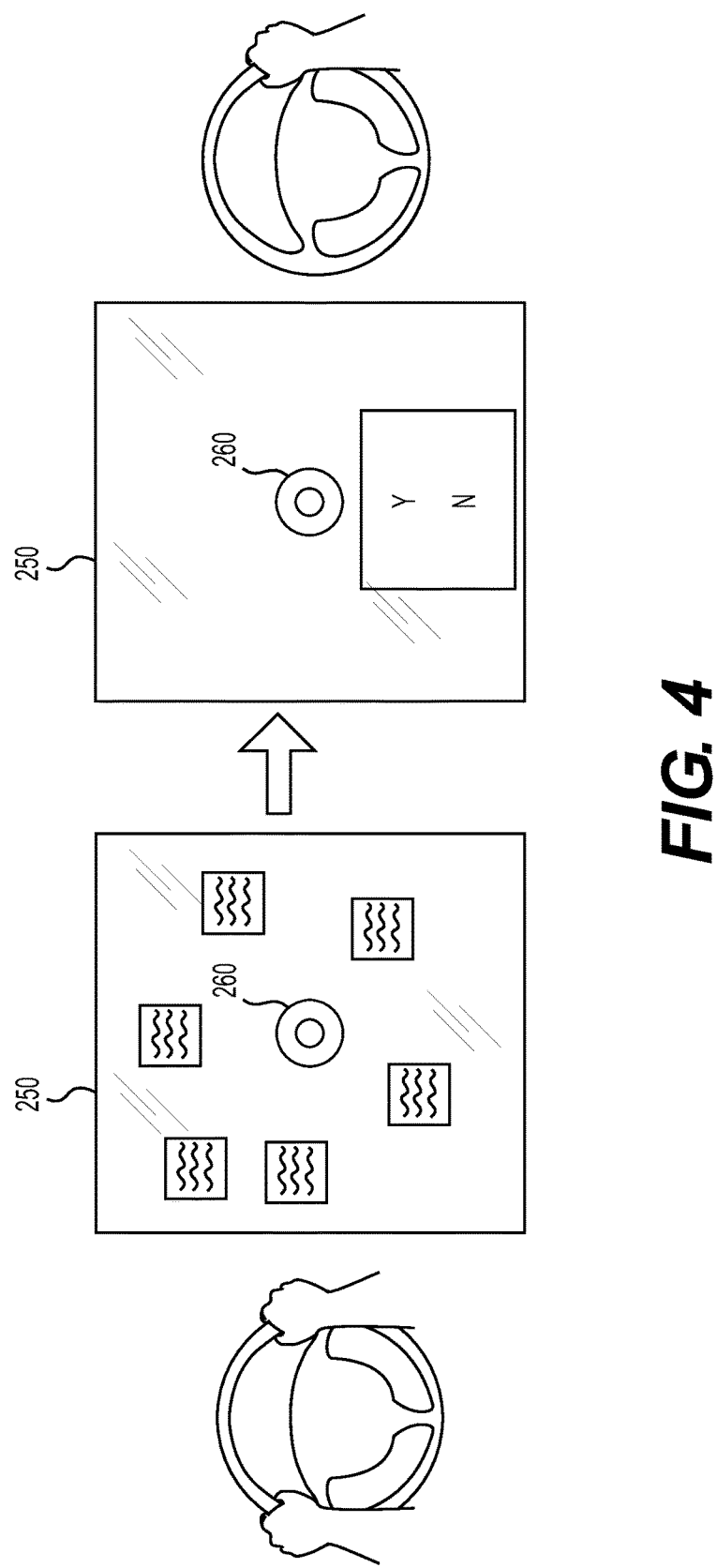
Figure 5:
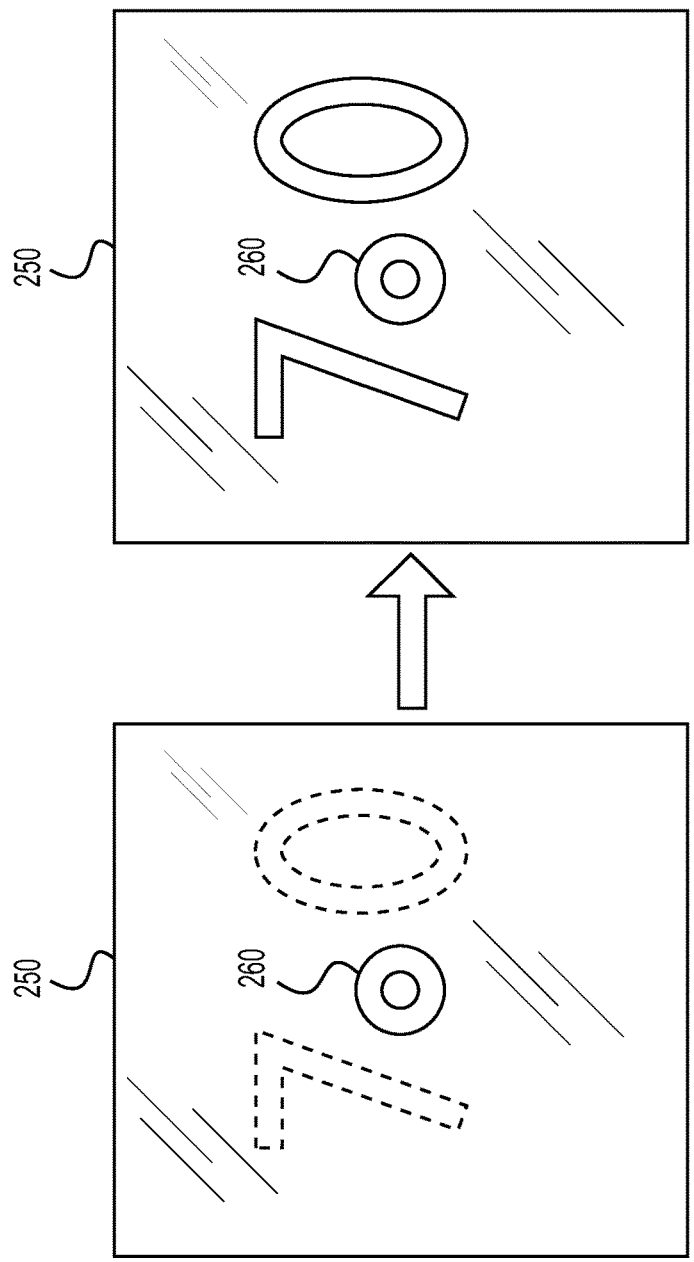
Figure 5:
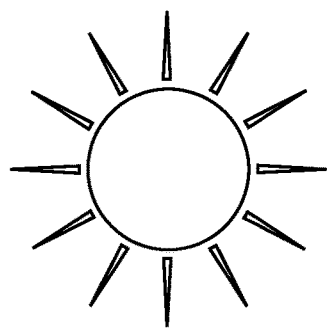

FIGS. 3-5 illustrate example implementations of the system 200.

The image/video capturing device 260 may be oriented in a position behind the transparent display 250. The image/video capturing device 260 may be oriented in a way to capture the contents being displayed on the transparent display 250, the viewer of the transparent display 250, and any other object in an environment in which the image/video capturing device 260 and the transparent display 250 is implemented at. The transparent display 250, the image/video capturing device 260 and system 200 may be implemented in an environment such as a dashboard of a vehicle.

The image receiving module 210 receives either images or videos from the image/video capturing device 260. The image receiving module 210 may receive either the images or videos at predetermined intervals, in real-time, or instigated based on an operation of the vehicle or motion detected by the image/video capturing device 260. The image receiving module 210 may store the images or videos in a data store 205.

The display interfacing module 220 interfaces with the transparent display 250. The transparent display 250 may monitor the current content being displayed on the transparent display 250. Alternatively, the transparent display 250 may interact with a buffer implemented with the transparent display 250 and retrieve content that has already been displayed on the transparent display 250.

The analysis module 230 includes a facial detection module 231, an error detection module 232, an environmental detection module 233, and a gesture detection module 234. Depending on the implementation of system 200, various combinations of the elements 231-234 may be selectively included. The various elements of the analysis module 230 may interact with the image/video capturing device 260 and the transparent display 250 to perform the various operations described below.

The facial detection module 231 analyzes the image/video captured by the image receiving module 210. The facial detection module 231 determines if the image contains the viewer of the transparent display 250. The facial detection module 231 may further identify the viewer's face, or even further, identify features on the face. For example, an identified feature may be the viewer's eyes. Once the feature is identified, the facial detection module 231 may determine a state of the viewer's eyes, such as the eyes being closed, squinting, or wide open.

The error detection module 232, based on the content retrieved by the display interfacing module 220, may determine if the transparent display 250 is currently misoperating. For example, if the transparent display 250's driving logic contains an error, the transparent display 250 does not display the correct information, or the like, the error detection module 232 may record this error or inconsistency. The error detection module 232 is facilitated by the placement of the image/video capturing device 260 in a position in which it directly views the transparent display 250.

In another example, the error detection module 232 may review the refresh/rendering rate on the transparent display 250. If the error detection module 232 detects that the refresh/rendering rate is not within a predetermined threshold of an acceptable rate, the error detection module 232 may record that an error has occurred.

In another example, the error detection module 232 may interface with a sensor or another image/video capturing device associated with a location at which the system 200 is implemented. For example, if system 200 is implemented in a vehicle, an exterior camera/sensor associated with the vehicle may determine that the speed of the vehicle should be or is at 70 miles per hour (mph). The image/video capturing device 260 simultaneously may determine that the transparent display 250 indicates a speed of 65 mph. In this situation the error detection module 232 may detect that the transparent display 250 is erroneously indicating wrong data.

The environmental detection module 233 may detect a certain aspect of the environment that may affect the quality of the transparent display 250. The environmental detection module 233 may determine that the conditions of the environment are influenced by a large amount of ambient light. In another example, the environmental detection module 233 may determine that the outside conditions are affected by an overcast day. The environmental detection module 233 may record this condition in the data store 205, and periodically update this recordation at every predetermined interval. For example, if the vehicle in which the system 200 is implemented in enters a dark place, such as a tunnel, and then egresses the tunnel, the environmental detection module 233 may update its recordation of the outside environment based on this reading.

The gesture detection module 234 may record a gesture made by the viewer of the transparent display 250. For example, if the viewer wave's his/her hand in front of the image/video capturing device 260, the gesture detection module 234 may detect this wave, and subsequently translate this motion or action into a command.

The output module 240 translates the various monitored data associated with the above described elements, and either signifies information detecting an error, or modifies the transparent display 250. If an error is signified, the error may be communicated to a processor associated with the operation of the transparent display 250, or alternatively, displayed on the transparent display 250. The output module 240 includes a display modification module 241 and an error indication module 242.

The display modification module 241 modifies the transparent display 250 based on the various data analysis performed by the analysis module 230. For example, if the facial detection module 231 detects that the viewer of the transparent display 250's eyes are squinting, the transparent display 250 may be adjusted accordingly. An example is shown in FIG. 3.

In another example, the display modification module 241 may modify the transparent display 250 based on the detected gesture by the gesture detection module 234. The gesture detection module 234 may determine that a hand is waving in front of the transparent display 250. The hand gesture may be translated into an operation enacted on the transparent display 250.

Alternatively, the gesture detection module 234, in response to system 200 being implemented in a vehicle, may detect that a hand has been displaced from a steering wheel. In response to one of the viewer's hand being displaced from the steering wheel, the transparent display 250 may be controlled to display a simpler display. A justification for this is that the system 200 becomes cognizant of the fact that the viewer is operating the vehicle, and thus, may be aided by a simpler user interface. An example of this is shown in FIG. 4.

In another example, if the system 200 is implemented in a location that experiences dynamic environments, such as a vehicle, the display modification module 241 may alter the transparent display 250 based on the current environment. For example, based on excessive sunlight, or too little lighting, the transparent display 250 may alter a contrast on the transparent display 250 based on the detection of the environmental detection module 233. An example of this is shown in FIG. 5.

The error indication module 242 indicates an error based on the detected error by the error detection module 232. The error indication module 244 may record the error in the data store 205, or transmit the error to a central processing unit (computer 100). Alternatively, the error indication module 242 may instigate the transparent display 250 to display the error.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

I claim:

1. A system for adjusting a transparent display with an image capturing device, comprising:
   a data store comprising a computer readable medium storing a program of instructions for the adjusting of the transparent display;
   a processor that executes the program of instructions; wherein the processor is a circuit configured to:
   receive an image from the image capturing device, the image capturing device being situated behind a side in which the transparent display presents content;
   interface with the transparent display;
   analyze the received image with the processor to perform an analysis;
      perform an error indication based on the analysis, wherein the image capturing device is oriented to capture the image of content being presented on the transparent display, and
      based on the analysis indicating that the captured image is different than data being propagated to the transparent display, the processor is further configured to detect an error, wherein the transparent display is an instrument cluster, and the image capturing device is installed in a dashboard portion of a vehicle in which the instrument cluster is installed in,
   wherein the detected error is a difference between information from the image and another sensor, and
   wherein the analysis further comprises detecting an outside environmental condition, wherein the outside environmental condition pertains to external lighting, and
   the processor is configured to modify the transparent display based on the outside environment condition.

2. The system according to claim 1, wherein the processor is further configured to detect a face observing the transparent display.

3. The system according to claim 2, based on the detected face, performs the transparent display modification.

4. The system according to claim 3, wherein the detected facial feature are eyes of the face squinting.

5. The system according to claim 1, wherein the another sensor is a speedometer.

6. The system according to claim 1, wherein the detected error is a software bug.

7. A system for adjusting a transparent display with an image capturing device, comprising:
   a data store comprising a computer readable medium storing a program of instructions for the adjusting of the transparent display;
   a processor that executes the program of instructions;
   wherein the processor is a circuit configured to:
   receive an image from the image capturing device, the image capturing device being situated behind a side in which the transparent display presents content;
   interface with the transparent display;
   analyze the received image with the processor to perform an analysis; and
   perform a transparent display modification or an error indication based on the analysis, wherein the system is installed in a vehicle, wherein the image capturing device is oriented to capture the image of content being presented on the transparent display, and based on the analysis indicating that the captured image is different than data bang propagated to the transparent display, the processor is further configured to detect an error, wherein the transparent display is an instrument cluster, and the image capturing device is installed in a dashboard portion of a vehicle in which the instrument duster is installed in,
   wherein the detected error is a difference between information from the image and another sensor, and
   wherein the analysis further comprises detecting an outside environmental condition, wherein the outside environmental condition pertains to external lighting, and
   the processor is further configured to modify the transparent display based on the outside environment condition.

8. The system according to claim 7, wherein the processor is further configured to detect a face observing the transparent display.

9. The system according to claim 8, based on the detected face, performs the transparent display modification.

10. The system according to claim 9, wherein the detected facial feature are eyes of the face squinting.

11. The system according to claim 7, wherein the another is a speedometer.

12. The system according to claim 7, wherein the detected error is a software bug.

* * * * *